United States Patent [19]

Dales

[11] 4,192,921

[45] Mar. 11, 1980

[54] CROSSLINKED GEL ION EXCHANGE RESIN BEADS CHARACTERIZED BY STRAIN BIREFRINGENCE PATTERNS

[75] Inventor: Mark J. Dales, Southampton, Pa.

[73] Assignee: Rohm and Haas Company, Philadelphia, Pa.

[21] Appl. No.: 865,273

[22] Filed: Dec. 28, 1977

[51] Int. Cl.$^2$ .................... C08F 00/00; B01D 15/04
[52] U.S. Cl. .................................... 521/38; 526/235
[58] Field of Search ............... 526/235; 260/2.2 R; 521/38

[56] References Cited

U.S. PATENT DOCUMENTS

| 2,569,506 | 1/1946 | Vandenberg | 526/235 |
| 2,569,884 | 10/1951 | Drake | 526/235 |
| 3,729,457 | 4/1973 | Davankov et al. | 260/2.2 R |
| 3,870,663 | 3/1975 | Clemens et al. | 260/2.1 E |

FOREIGN PATENT DOCUMENTS

| 86741 | 7/1976 | Poland | 260/2.1 R |
| 914885 | 1/1963 | United Kingdom | 526/235 |

OTHER PUBLICATIONS

Handbook of Chem. & Physics, Forty Third Edition, pp. 1492–1497.

Primary Examiner—Joseph L. Schofer
Assistant Examiner—Peter F. Kulkosky
Attorney, Agent, or Firm—Louis F. Kline, Jr.

[57] ABSTRACT

Hard, infusible, discrete beads of crosslinked copolymer are prepared by free-radical catalyzed polymerization of a monomer mixture in aqueous dispersion wherein oxygen is incorporated in the monomer mixture. Ion exchange resins having improved mechanical strength are obtained by attaching functional groups to the copolymer.

33 Claims, 4 Drawing Figures

FIGURE I
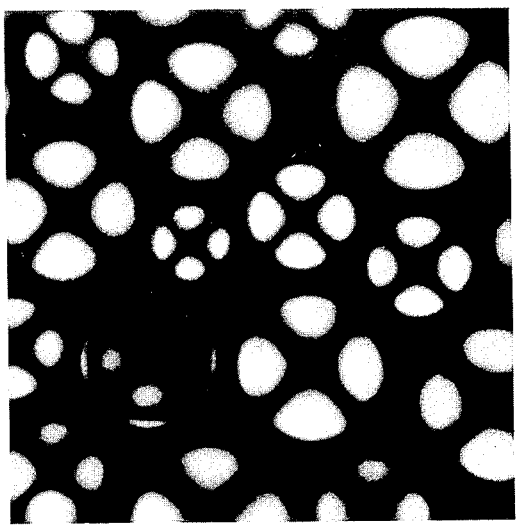
A
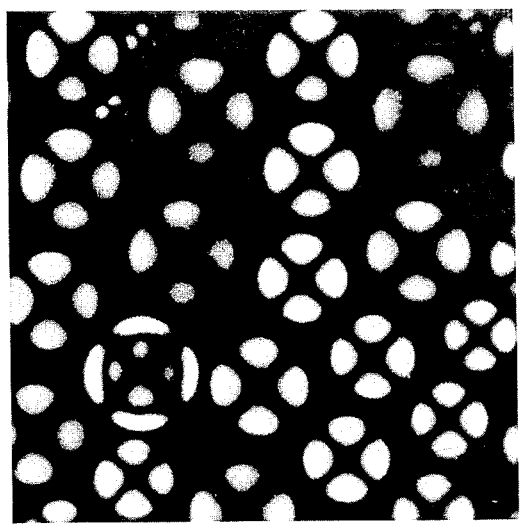
B
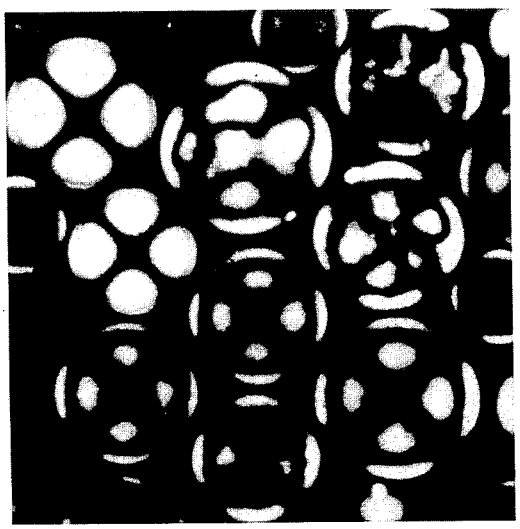
C
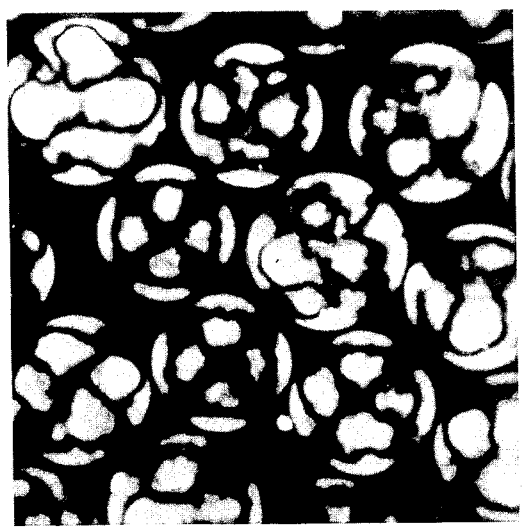
D

FIGURE II
A
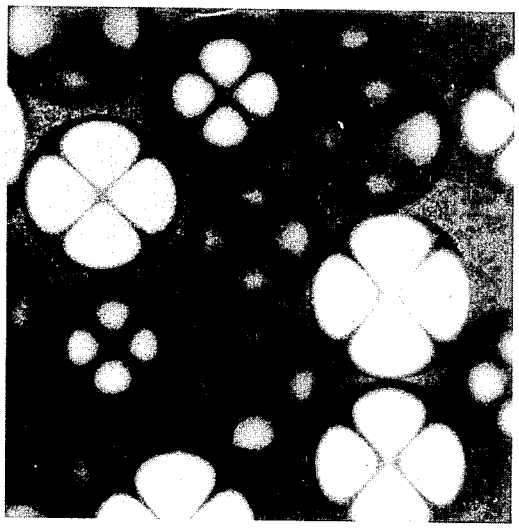
B
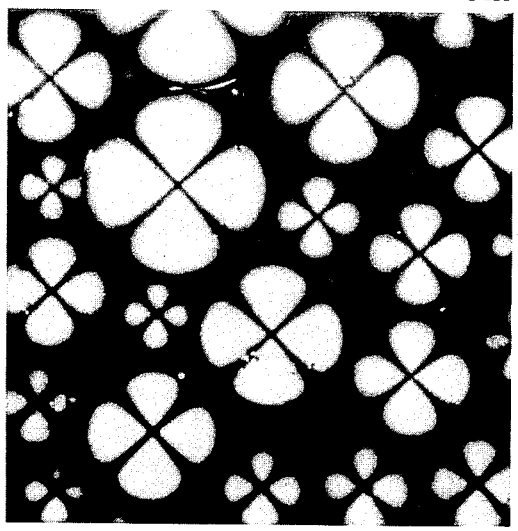
C
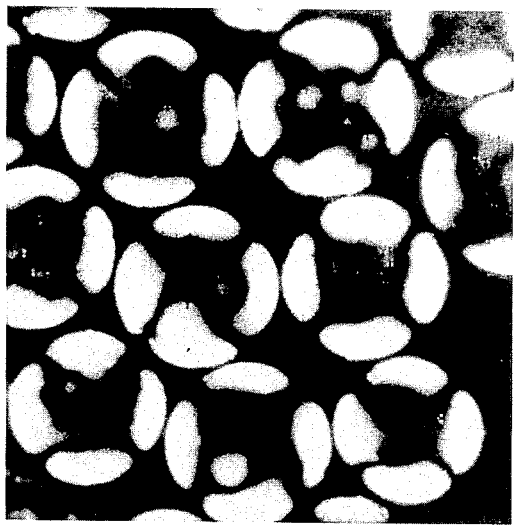
D

FIGURE III
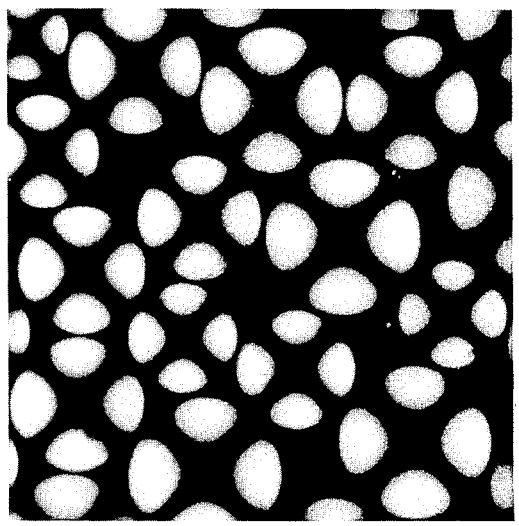
A
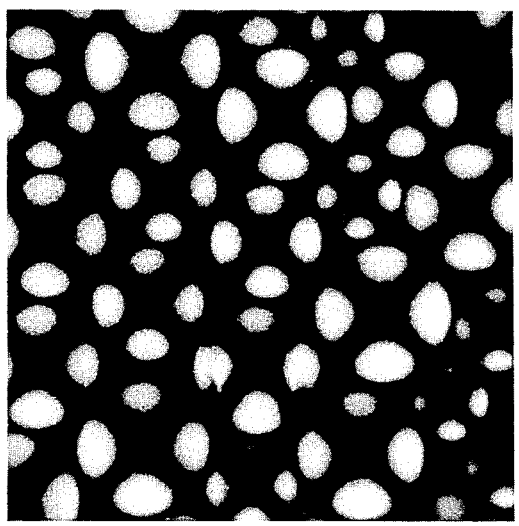
B
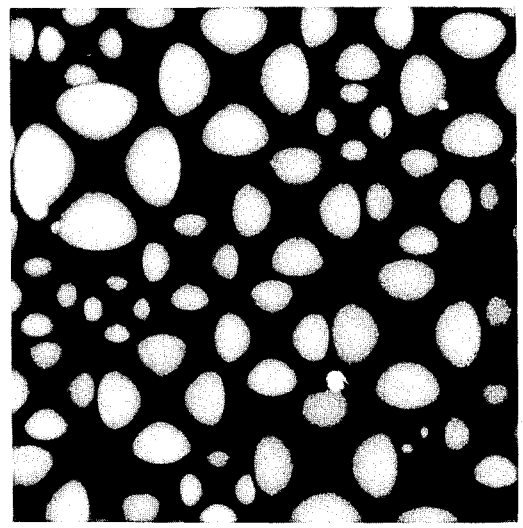
C
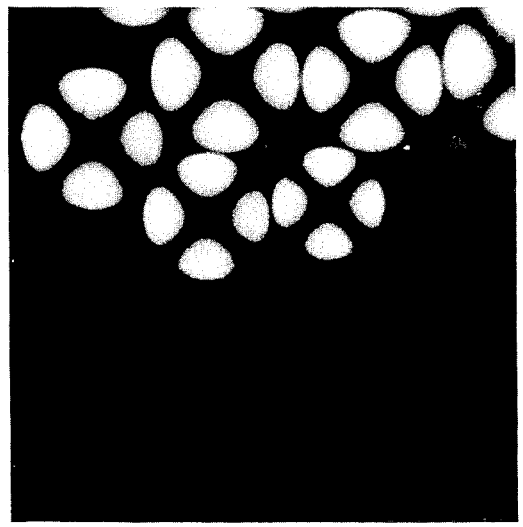
D

FIGURE IV
34X 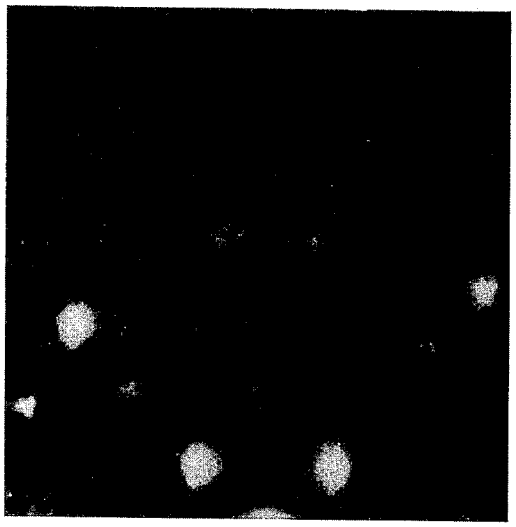 34X 
A B
34X 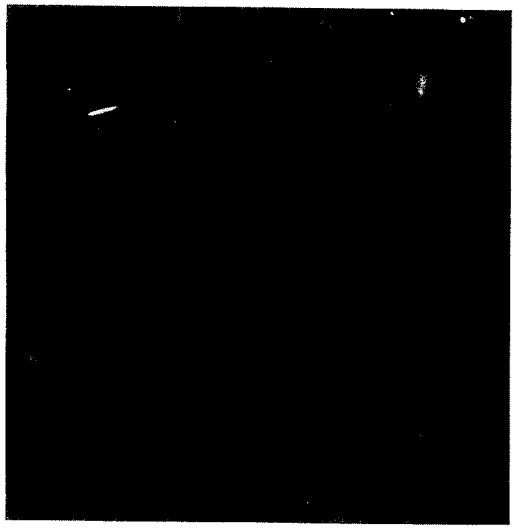 34X 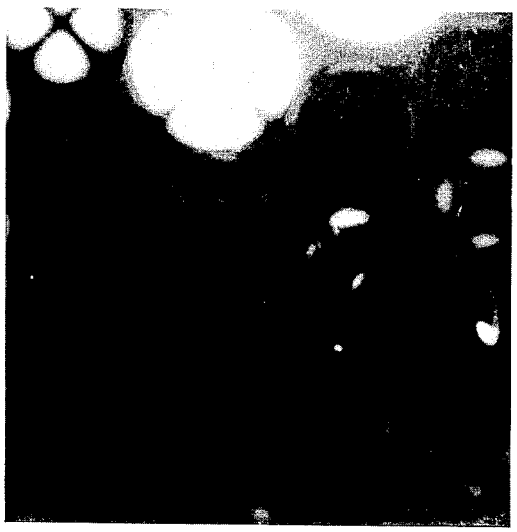
C D

CROSSLINKED GEL ION EXCHANGE RESIN BEADS CHARACTERIZED BY STRAIN BIREFRINGENCE PATTERNS

This invention concerns an improved process for the preparation of crosslinked vinyl copolymers as discrete copolymer beads in aqueous dispersions using oxygen in the polymerization in a novel way. The invention also concerns the ion exchange resins having improved physical characteristics obtained by appending conventional ion exchange functional groups to said copolymers.

The techniques of preparing crosslinked vinyl copolymers in bead form (as precursors for conversion into ion exchange resins) by free-radial catalyzed polymerization of the monomer mixture in aqueous dispersion are well known. The term "crosslinked vinyl copolymer" and the like is used for the sake of brevity herein to signify copolymers of a major proportion, e.g., from 50 upwards to about 99.5 mole percent, normally 80 to 99%, of a monovinyl monomer, preferably, monovinyl aromatic monomers, e.g., styrene, vinyl toluene, vinyl naphthalene, ethyl vinyl benzene, vinyl chlorobenzene, chloromethyl styrene, and the like, with a minor proportion, e.g., of from about 0.5 up to 50 mole percent, preferably 1 to 20%, of polyvinyl compounds having at least two active vinyl groups polymerizable with the aforesaid monovinyl monomer to form a crosslinked, insoluble, infusible copolymer, for example, divinyl benzene, trimethylolpropane trimethacrylate, ethylene glycol dimethacrylate, divinyl toluene, trivinyl benzene, divinyl chlorobenzene, diallyl phthalate, divinylpyridine, divinyltoluene, divinylnaphthalene, ethylene glycol diacrylate, neopentyl glycol dimethacrylate, diethylene glycol divinylether, bisphenol-A-dimethacrylate, pentaerythritol tetra- and trimethacrylates, divinylxylene, divinylethylbenzene, divinyl sulfone, divinyl ketone, divinyl sulfide, allyl acrylate, diallyl maleate, diallyl fumarate, diallyl succinate, diallyl carbonate, diallyl malonate, diallyl oxalate, diallyl adipate, diallyl sebacate, divinyl sebacate, diallyl tartrate, diallyl silicate, triallyl tricarballylate, triallyl aconitrate, triallyl citrate, triallyl phosphate, N,N'-methylenediacrylamide, N,N'-methylene dimethacrylamide, N,N'-ethylenediacrylamide, trivinyl naphthalene, polyvinyl anthracenes and the polyallyl and polyvinyl ethers of glycol glycerol, pentaerythritol, resorcinol and the monothio and dithio derivatives of glycols. The copolymer may also have incorporated therein polymerized units of up to about 5 mole % of non-aromatic vinyl monomers which do not effect the basic nature of the resin matrix, for example, acrylonitrile, methyl acrylate, butadiene and others known in the art.

The conventional conditions of polymerization used heretofore lead to crosslinked vinyl copolymers, which, when converted to ion exchange resins by attachment of functional groups thereto, have certain operational deficiencies resulting from physical weaknesses.

The practice of the present invention yields ion exchange resins in which the polymer beads have greater mechanical strength and increased resistance to swelling pressures which are produced within a bead during acid/base cycling (i.e., osmotic shock). The greater mechanical strength of the beads manifests itself in improved resistance to physical breakdown from external forces such as weight of the resin column bed, high fluid flows and backwashing. Thus, the physically stronger ion exchange resins embodied herein are especially useful in treating fluid streams of high flow rates, for example, condensate polishing applications in which resins of lesser quality are prone to mechanical breakdown and short life spans.

In the past, it has been the practice not to include oxygen during the preparation of crosslinked vinyl polymers used as the base matrix copolymer for ion exchange resins since oxygen presents a safety hazard and has been generally regarded as detrimental to the properties of said polymer obtained by free-radical polymerization.

In accordance with this invention, the vinyl monomer, cross-linking monomer, and other optional monomer or monomers, are polymerized in an aqueous dispersion in the presence of a free-radical initiator and (1) in contact with an oxygen-containing gaseous mixture, (2) using a preoxygenated monomer mixture or (3) both (1) and (2), advantageously within a range of reaction temperatures of from about 30° to about 95° C., preferably 50° to 70° C. Thus, in order to improve absorption of oxygen by the monomer mixture, it is generally preferred to employ polymerization temperatures somewhat below, e.g., 5°–25° C., those normally used heretofore in suspension polymerization for similar products. Accordingly, the free-radical initiator used herein is one suitable for catalyzing polymerization at such temperatures, for example, such initiators as di(4-t-butycyclohexyl) peroxydicarbonate, dicyclohexyl, peroxydicarbonate, di-(secbutyl) peroxydicarbonate, di-(2-ethylhexyl) peroxydicarbonate, dibenzyl peroxydicarbonate, diisopropryl peroxydicarbonate, azobis(isobutyronitrile), azobis(2,4-dimethylvaleronitrile), t-butyl peroxypivalate, lauroyl peroxide, benzoyl peroxide, t-butyl peroctoate, t-butyl peroxyisobutyrate, and the like. The amount of initiator employed is normally from about 0.1 to about 2 percent, based on monomer weight, preferably 0.3 to 1%. It also may be advantageous when using catalysts which are active at relatively low temperatures, such as 30°–60° C., to employ a second so-called "chaser catalyst" which is active at higher temperatures in order to achieve higher yields of crosslinked vinyl polymer, for example, from about 0.05 to 0.1%, based on monomer weight of such initiators as benzoyl peroxide, t-butyl peroctoate, t-butyl peroxyisobutyrate, and the like. For a description of the preferred catalysts set forth above and optional polymerization adjuncts see commonly assigned copending U.S. Pat. applications U.S. Ser. Nos. 904,178 (filed May 8, 1978) and 951,102 (filed Oct. 13, 1978) which are hereby incorporated herein by reference.

BRIEF DESCRIPTION OF THE DRAWINGS

FIGS. I and II appended hereto illustrate the unique birefringence patterns exhibited by the product of the invention as compared to typical prior art products birefringence patterns illustrated in FIGS. II and III also appended.

As mentioned above, the process of this invention involves contacting the monomer mixture with oxygen such that oxygen is absorbed by the monomer mixture at least until the polymerization reaches the gel point, i.e., the point at which an infinite polymeric network occurs (see, for example, Fundamental Principles of Polymerization by G. F. D'Alelio, John Wiley & Sons, Inc., 1952, page 93). Known procedures for involving gaseous reactants in polymerization systems are used to incorporate the oxygen in the monomer mix. For example, the head space above the reaction medium is purged with an oxygen-nitrogen gaseous mixture (prior to initiation of reaction by raising the temperature) and then a gaseous sweep of the appropriate $O_2$—$N_2$ mixture is passed through the head space during the reaction period. The gaseous mixture may contain as much as 20% oxygen, however, for purposes of safety in the avoidance of explosion-prone conditions, lower levels may be required depending on the explosive range of the mixtures of the specific vinyl monomer or monomers with oxygen in the vapor phase, e.g., less than 9% oxygen in the case of a styrene and divinylbenzene mixture. Since the absorption of oxygen by the monomer droplets depends not only on temperature and the partial pressure thereof in the gas in the head space, but also on the area of reaction medium exposed to said head space, the configuration of the kettle will determine whether it is advantageous to operate at atmospheric pressure or under increased pressures, for instance up to five or more atmospheres, inasmuch as increased pressure causes greater oxygen absorption. An alternative method of introducing oxygen into the monomer mixture is to sparge the gaseous mixture into the monomer mixture before and/or during polymerization.

The aqueous medium in which the polymerization is conducted in dispersion form will contain minor amounts of the conventional suspension additives, that is, dispersants such as xanthan gum (biosynthetic polysaccharide), poly (diallyl dimethyl ammonium chloride), poly acrylic acid (and salts), poly acrylamide, magnesium silicate, and hydrolyzed poly (styrene-maleic ahydride); protective colloids such as carboxymethyl cellulose, hydroxyalkyl cellulose, methyl cellulose, polyvinyl alcohol, gelatin, and alginates; buffering aids such as phosphate and borate salts; and pH control chemicals such as sodium hydroxide and sodium carbonate.

The crosslinked, high-molecular weight copolymers are recovered from the reactor as hard, discrete beads of particle size within the range of about 0.02 to 2 mm, average particle size being on the order of 0.2 to 1 mm. These copolymers are converted to ion exchange resins by functionalization according to known means, such functional groups including sulfonamide, trialkylamino, tetraalkyl ammonium, carboxyl, carboxylate, sulfonic, sulfonate, hydroxyalkyl ammonium, iminodiacetate, amine oxide, phosphonate, and others known in the art. Functionalizing reactions which may be performed on vinyl aromatic copolymers to produce ion exchange resins are exemplified by sulfonation with concentrated sulfuric acid, chlorosulfonation with chlorosulfonic acid followed by amination, reaction with sulfuryl chloride or thionyl chloride followed by amination, and chloromethylation followed by amination. Ion exchange resins maybe further delineated by the types: strong acid cation, i.e., containing the groupings sulfonic (—$SO_3H$) or sulfonate (—$SO_3M$, where M is usually an alkali metal ion); weak acid cation, i.e., containing the carboxyl (—$CO_2H$) or carboxylate (—$CO_2M$, where M is usually an alkali metal ion) groupings; strong base anion, i.e., containing the tetraalkyl ammonium grouping: —$NR_3X$, where R is an alkyl or hydroxy alkyl group and X is usually chloride or hydroxide; and weak base anion, i.e., containing a trialkylamino group: —$NR_2$, where R is an alkyl or hydroxyalkyl group.

The unique properties of the copolymers produced according to this invention are reflected in their different characteristics under thermal analysis and solvent swelling and when converted to ion exchange resins by the attachment of the aforesaid functional groups. The enhanced physical strength of these latter resins is apparent from their resistance to crushing which is conveniently measured on the Chatillon instrument, as well as by visual inspection before and after use in ion exchange applications. For example, strongly acidic styrene-type resins frequently exhibit Chatillon values in the range of about 900 to about 5000 gm. force per bead, preferably 1200-5000, in contrast to resins derived from copolymers prepared by prior art polymerization methods which have Chatillon values in the range of about 50 to 550 gm./bead. Similarly, anion styrene-type resins of the invention exhibit Chatillon values of about 500 to 2500 preferably 600-2500 and often in the 900-1500 range in contrast to resins derived from copolymers prepared by prior art methods which have typical Chatillon values of 25 to 400.

The improved gel ion exchange resins of the present invention, particularly the most common commercial resins produced from aromatic copolymers, can be easily distinguished from the prior art resins by one or more of various physical parameters including (1) perfect bead count (fewer cracked and fragmented beads), (2) resin friability (Chatillon test), (3) resistance to fracture upon repeated cycles of exhaustion regeneration (Microcycling Test), and (4) the birefringence patterns of the beads. Test methods and observations of these distinguishing characteristics follow.

In some instances, prior art resins have exhibited high physical stability by one or more of test (1)–(3) above, but have failed to achieve excellence in all three criteria. In the cation resins, about 75% to 90% of the resins used commercially have intermediate levels of crosslinker, that is about 4–12% usually 7–10% crosslinker (preferably divinylbenzene, DVB). The most common anion resins, from a commercial standpoint, are those containing relatively low levels of crosslinker, that is, about 1–10% usually 2–5% crosslinker. The improved products of the invention result with all levels of crosslinker, although illustrated herein principally with the most common types. The differences between the birefringence patterns of the novel resins disclosed herein and similar resins of the prior art may be less pronounced at lower crosslinker levels where internal residual resin stress is a less significant factor. The improvement can nevertheless be ascertained when comparing the novel resins with the same type (and crosslinker content) resins of the prior art in either relaxed or artificially stressed state (e.g., in swelling solvents).

PERFECT BEAD COUNT

Perfect bead count is determined microscopically after functionalization of the copolymer such as by sulfonation or chloromethylation and amination of the copolymer. Perfect beads are those which contain no visible flaws, that is, beads which are perfectly spherical with no cracks, fragments, pits or surface defects. Products of the invention contain at least 90% or more of perfect beads, typically 93-99% perfect beads, by visual observation and count. Prior are resins typically contain about 40-99% perfect beads. However, many grades of commercial resins typically have perfect bead counts of only 40-50% (e.g., see, FIG. II, C and D described below).

ACID/BASE CYCLING (MICROCYCLING) TEST

Microcycling is designed to simulate on an accelerated time scale the conditions under which the resin will be used. These studies are conducted over a period of a few days rather than months or years typical of field conditions. Repeated exhaustion-regeneration cycles are performed on the resin at predetermined intervals in a fully automated apparatus.

The resin to be tested is screened to a $-20+30$ U.S. mesh cut size and examined under a microscope for appearance before microcycling: four different fields of view of a monolayer of beads are observed and the average result for each of the following is recorded:
(a) % perfect beads
(b) % cracked beads
(c) % fragmented/broken beads A small portion of the screened resin (0.5 ml) is placed in a sintered glass filter tube such that a monolayer of beads is formed in the tube. This small quantity of resin beads assures good contact between solution and resin and total conversion of the resin during each step. The solutions used for exhaustion and regeneration are made up in advance and stored in 50 liter tanks. The solutions used for anion and cation resins are desribed below:

| Resin Type | Exhaustion Solution | Regeneration Solution |
|---|---|---|
| Anion | 0.25 N $H_2SO_4$ | 1.0 N NaOH |
| Cation | 0.5 NaOH | 1.0 N HCL |

During a typical experiment, approximately 200 ml of exhaustion solution is added dropwise to the resin sample over 10 minutes, followed by removal of bulk exhaustant by mild vacuum, a deionized water rinse followed by mild vacuum, and dropwise addition of regenerant solution over 10 minutes followed by removal of bulk regenerant by mild vacuum and a water rinse; completion of the aforementioned process represents an exhaustion-regeneration cycle and requires approximately 30 minutes. Complete automation allows 100 cycles to be completed in about 48 hours. After completion of 100 cycles, the resin is recovered and inspected microscopically for appearance. The reduction in % perfect bead content is recorded as the breakdown.

The product of the invention generally show a reduction of perfect bead count of less than about 30%, normally not more than about 15% after 100 cycles by the Microcycling Test. The cation resins exhibit less reduction of perfect beads, not more than 10%, and usually 0-5%. Anion resins may show reductions of up to 30%, normally 0-15%. By comparison, prior art cation resins are known to exhibit reductions of from 15-80% most typically 30-50%. Anion resins available heretofore show perfect bead reductions of 15-80% after 100 cycles with 15-50 being most typical.

CHATILLON TEST FOR RESIN FRIABILITY

The Chatillon test is named for an apparatus manufactured by John Chatillon and Sons, New York, N.Y. and designed to measure resin friability. This instrument MODEL LTCM, Gauge DPP-2.5KG) measures the force (grams) required to crack or fracture a resin bead when it is placed between two parallel plates. The plates are gradually brought together at a uniform rate until the resin "breakpoint" is reached. The purpose of this test is to simulate the frictional and pressure forces exerted on individual resin beads under actual use conditions.

Specifications for testing include converting the resin into the proper form (hydrogen or sodium for cation resins tested herein and chloride form for anion resins tested herein) by well known standard procedures. The converted resin is screened to a $-20+30$ U.S. mesh cut size and then allowed to fully hydrate in deionized water for at least 15 minutes prior to testing. Actual testing is done on a single resin bead (covered by a small drop of water) in the Chatillon instrument using the lowest practical speed of descent of the crushing plate. The individual fragmentation forces are recorded from the instrument in grams per bead and the results are presented as an average (20 beads minimum, typically 30 beads), a standard deviation, a 95% confidence interval, and the percentage of beads which meet a minimum friability standard.

BIREFRINGENCE TEST

An analytical test which aids in identifying gel resins of the invention and generally distinguishing the same from prior art counterparts is the birefringence test. The technique for obtaining birefringence patterns involves the use of an optical microscope (e.g., Carl Zeiss Photomicroscope) set up for bright field illumination at low magnification (e.g., 34×). Polarized lenses are inserted above and below the microscope stage and oriented perpendicular to one another. A piece of frosted glass is mounted on the stage to provide diffuse illumination of the samples. Approximately 30-50 beads of the sample resin to be analyzed are then placed in the concave well of a deep-dish microscope slide. The well is filled with water and then covered with a large coverslip. The slide so prepared is placed on the frosted glass mounted on the stage, the focus adjusted to optimize definition of the outer edge of the beads, and a photomicrograph is made to illustrate the birefringence pattern.

Observations of a large number of birefringence patterns taken of ion exchange resin samples produced by the invention and comparison of the same with patterns of contemporary commercial resins produced by the various manufacturers have revealed clear distinctions between the patterns. Both cation and anion resins are distinguishable from prior art counterpart resins, but on a somewhat different basis and therefore the cations and anions resins shall be described separately.

CATION RESINS

The use of birefringence strain patterns to identify the stresses in cation resins is not new to the art of ion exchange (see, for example Wheaten R.M., et al., Industrial and Engineering Chemistry, Vol. 44, No, 8, August 1952, pp. 1796-1800). We have now further identified a number of characteristic patterns and empirically correlated such with the physical properties of the resin including residual internal bead stress so as to obtain a qualitative indentification of resin origin and properties. High internal residual stress in the resin beads has been found to correspond directly with low physical stablity. The cation, low stress resins of this invention are generally illustrated by patterns A-D in FIG. I appended hereto while some of the most widely used resins presently available from various manufacturers are illustrated by patterns A-D in FIG. II. The photographs showing the birefringence patterns were made at essentially the same film exposure and sample illumination.

In general, the patterns showing the highly stressed products (and therefore those more susceptible to fracture or breakage) can be identified by the brightness and sharpness of the pattern as well as the pattern type. Referring to the appended Figures, the more highly stressed beads are found in FIG. II which contains sharper, brighter individual bead patterns on an overall basis. Note that this observation and other observations described herein are often made on overall or gross appearance of a sample owing to differences between the individual beads in a single batch or sample. Further, it is postulated that some of the commercial samples observed consist of composites or physical mixtures of materials produced under different conditions and therefore the patterns may illustrate the sensitivity of the product quality to variations in the process of preparation.

A Maltese cross, or some variation thereof, is typically observed in resin strain birefringence patterns and is indicative of spherically symetric stress orientation. Any application of physical stress on an ion exchange resin bead produces a strain pattern, typically a Maltese cross. This phenomenon may be observed when compressing a relatively unstressed bead between parallel planes and when inducing stress through osmotic pressure such as when swelling a bead in solvent. The width and sharpness of the arms of the Maltese cross furnish a qualitative (sometimes quantitative) indication of strain. The sharper, narrower arms indicating higher stress, especially when accompanied by bright areas between arms.

Applying the foregoing general considerations, the strain birefringence patterns in FIGS. I and II can be distinguished. The low stress cation resin products illustrated in FIG. I, A-D resins in hydroen form have at least one of three identifying patterns, namely:

(1) a broad Maltese cross enclosed by an extinction (dark) ring around the periphery of the bead (pattern predominating in FIG. I, A and B)., (2) a broad Maltese cross enclosed by an extinction ring that is distinctly inside and separatred from the periphery of the bead (FIG. I, A, B and C—perhaps best observed in lower half of C), and (3) an irregular pattern, sometimes resembling a randomly oriented chain and sometimes recognizable as a distorted version of (2), above (FIG. I, patterns C and D, but best observed in D).

Each of the patterns of FIG. 1, A thru C containing a Maltese cross are relatively dull, with broad, and somewhat blurred arms comprising the Maltese cross. While the pattern of FIG. I, D is less distinct, it too is somewhat dull with more random stress patterns, probably indicative of random stress orientation. All of the patterns in FIG. I are typical of the prior art cation gel resins which are illustrated in FIG. II. All cation resins in FIG. I were produced from a styrne/divinylbenzene (8%) copolymer backbone using oxygen moderated copolymerization techniques described in the examples contained herein. The material of FIG. I, C is a composite of three laboratory-prepared samples. All were sulfonated to produce strongly acidic resins.

Typical strain birefringence patterns for prior art gel resins are illustrated in FIG. II, A thru D, which patterns have at least one of three identifiying criteria:

(a) A square superimposed upon a Maltese cross (see FIG. II, A), (b) a sharp Maltese cross having narrow arms and bright regions between the arms, with or without an outer extinction ring (see FIG. 11, C and some beads in B), and (c) an irregular pattern, sometimes resembling a distorted cross (or swastika) and sometimes a square superimposed upon a cross resembling (a), above (FIG. II, D.)

The pattern in FIG. II, B represents a sample of relatively high quality prior art styrene/DVB gel resin containing about 8% DVB in the copolymer backbone (sample of manufacturers regular product line). The pattern in FIG. II, C represents a sample of relatively poor quality prior art styrene/DVB gel resin containing about 8% DVB, and exhibiting many surface defects and poor physical stability by both the microcycling and Chatillon Tests described herein (sample obtained from manufacturer's regular product line). Another poor styrene/DVB resin containing surface defects and bubbles and having low physical stability is illustrated in FIG. II, D (manufacturer's commercial product). The sample from which the pattern of FIG. II, A was produced was a styrene/8% DVB gel resin of intermediate prior art quality (manufacturer's normal commercial product). All resins illustrated in FIG. 11 were strongly acidic and in the sulfonic acid form.

While individual beads in a given pattern in FIG. I may have strain paterns nearly the same as patterns in FIG. II, one may easily distinguish the products on an overall basis. To illustrate, a similarity may be seen between some beads in FIG. I, A or B and FIG. II, B but a substantial number of beads are dissimilar. As used herein the expressions "substantially" or "corresonding substantially" shall have the foregoing meaning, that is, the bulk of the beads in a given pattern must correspond to the patterns described with only minor exceptions as illustrated by a comparison of the sample patterns appended to this specification as FIGS. I through IV. The resins of FIG. I are highly superior to the resins of FIG. II (even the best samples thereof) from a standpoint of the Chatillon test, perfect bead count and accelerated use testing (Microcycling Test).

On the basis of the above, and other studies of strain birefringence patterns, it is postulated that the differences in patterns between the new resins of the invention and those of prior art resins reflect different levels of residual stress within the resin beads. Although it is not intended that the invention is dependent upon any theory expressed herein, the patterns associated with the new resins are believed to represent conditions of low internal stress, whereas those patterns associated with the resins of FIG. II, A-D, reflect higher levels of internal resin stress. Since the stress which is responsible for the birefringence pattern is believed to be the residual stress within the bead, it follows that higher levels of stress would be expected to correspond to poorer physical quality. Birefringence patterns therefore offer a simple qualitative method of identifying and distinguishing the products of this invention.

Copolymer precursors for the Cation and Anion resins may also be distinguished from the prior art copolymer on the basis of thermal analyses and solvent swelling characteristics. Since these copolymers result in improved resins, it is clear that the copolymers are improved in composition over the prior art copolymers.

ANION RESINS

Anion exchange resins produced by the improved copolymerization techniques described herein may also be distinguished from prior art anion resins by strain birefringence patterns which correlate with improved physical properties. In general it has been discovered that the anion resins are distinguished principally on the basis of differences in the intensity of the birefringence patterns rather than differences in the shape or nature of the patterns themselves. Consequently, the experimental conditions must be standardized as much as possible and a sample used as an intensity reference, in order to allow direct comparison of birefringence patterns from one day to the next. Normally, it is preferable to focus the microscope on the outer edge of the beads. Factors such as the intensity of the light source, radiation losses in the microscope, the position of condensing lenses, the sensitivity of the film, and the exposure time greatly influence the overall intensity of the recorded image. However, for a given microscope, all of these factors are adequately reproduced and given a sample as an intensity reference, conditions from one day to another can be matched satisfactorily to allow direct comparison using photomicrographs.

The microscope and associated optics for obtaining birefringence patterns of anion resins were the same as had been used for the cation resins. However, the swelling solvent in which the anion resins were examined was ethanol rather than the water used for cation resins. Each anion resin was oven dried at 90°–100° C. for ca. 4 hours in vacuo, equilibrated overnight under ambient conditions, and then immersed in ethanol until swelling equilibrium had been achieved. All birefringence patterns of anion resin presented were obtained from samples in the chloride form which had been swollen in ethanol at least 7 days.

All of the anion resins, including those produced by the novel oxygen moderated process described herein, exhibit patterns which may be described qualitatively as a broad Maltese cross having little or no extinction ring at the periphery of the bead. However, when compared to the prior art resins, the resin of this invention, swollen to equilibrium in ethanol, exhibit patterns that are significantly more intense (brighter). Intensity differences in water are more difficult to characterize.

FIG. III, A–C illustrate the birefringence patterns of different samples of the improved resins at 34× magnification. The uniformity of pattern intensity and configuration is typical of anion resins by this invention. FIG. III, D illustrates a composite sample of the new resin (top of photo/bright) together with beads produced by prior art methods (bottom of photo/dull) without oxygen in the copolymerization process.

FIG. IV, A–D illustrate prior art products produced by four different manufacturers. All of the photomicrographs of FIGS. III and IV were made at the same exposure under conditions controlled, as explained heretofore, to allow comparisons of the pattern intensities. Even the low-intensity patterns of FIG. IV generally exhibit broad Maltese crosses, with a few beads showing strong stress patterns characteristic of the prior art cation resins.

The dominating characteristic of anion resins does not appear to be the residual internal stress in the resin beads as is the case with cation resins. However, the intensity of the broad Maltese cross birefringence patterns correlates directly and consistently with physical stability of the resin, the brighter patterns serving as "fingerprints" of the most physically stable resins. Whereas the dominating feature of cation resins was postulated to be the internal bead stress, applicant believes the greater swelling pressure that sustains in superior anion resins is evidence of a greater elastic component associated with the crosslinked gel network, which makes it possible for the network to better accommodate an externally applied stress without craze or crack formation. The more intense patterns of the new resins swollen to equilibrium in ethaol is indicative of a higher swelling pressure for the new resins.

It is recognized, of course, that certain selected samples representing the extremes in pattern intensity for new and prior art resins may be difficult to distinguish. Also, a given bead in a pattern may deviate substantially from the overall pattern of a prior art sample. However, based upon data for a substantial number of products examined, ambiguities in determining the quality of a particular product can be resolved by multiple analyses, preferably of different lots of the same product. In some cases, both for cation and anion resins of the prior art, the overall patterns showing wide divergence in patterns and/or intensity are indicative of the quality of the overall product rather than the presence of both good and poor quality beads within a single sample. To illustrate, the birefringence patterns in FIG. IV, B and D, should be interpreted as "fingerprinting" a typical prior art product which overall correlates with physical stability inferior to the products of this invention, rather than as comprising both good (high brightness) and bad (low intensity) beads. The bright patterns for a few beads in those samples are indicative of high internal stress and are to be excluded from a comparison of the patterns.

The need for different interpretations for the birefringence patterns between cation and anion resins is thought to be a consequence of different inherent properties between the cation and anion resins under study, owing principally to compositional factors such as crosslinking uniformity and the level of primary crosslinking which lead to differences in the relative contributions of swelling pressure and residual stress to the overall level of stress in the cation resins swollen in water vs. the anion resins swollen in ethanol. The importance of backbone elasticity in the anion resins has, at least in part, been substantiated by thermal mechanical analysis (TMA) above the copolymer glass transition point where a secondary yield point has been detected for both cation and anion copolymers prepared by the novel oxygen copolymerization method. Residual stresses appear to be substantially less important in the anion resins since the broad Maltese cross patterns that typify both the resins of the improved technology and those of the prior art are not suggestive of higly stressed beads.

Although it may be theorized that elasticity plays an important part in the physical stability of both cation an anion resin stability it has not been independently characterized with cation resins whose main "fingerprints" are differences in pattern types.

Reaction rate kinetic studies have indicated some moderation of the crosslinker (DVB) reaction rate when using oxygen-copolymerization compared to conventional methods leading to a premise that the copolymer matrix may be more homogeneously crosslinked by the method of the invention, and explaining the improved elasticity of the resins.

All of the resins represented by FIGS. III and IV contained low crosslinker levels typical of the most widely used styrene/divinyl benzene type anion exchange resins, that is, between about 2% and about 5% crosslinker (DVB).

In the cation resins (FIGS. I and II, above), about 75% to 90% of the resins used commercially have intermediate levels of crosslinker, that is 7–10% crosslinker (usually divinylbenzene, DVB). The most common anion resins, from a commercial standpoint, are those containing relatively low levels of crosslinker, that is, about 2–5% crosslinker. The improved products of the invention result with all levels of crosslinker, although illustrated herein principally with the most common types. The differences between the novel resins disclosed herein and similar resins of the prior art may be less pronounced at lower crosslinker levels where internal residual resin stress is a less significant factor. The improvement can nevertheless be ascertained when comparing the novel resins with the same type (and crosslinker content) resins of the prior art in either a relaxed or artificially stressed state (e.g., in swelling solvents).

The process of the invention is clarified by the following illustrative examples which are not to be construed as limitative thereof.

POLYMERIZATION PROCEDURE

The polymerization reactor is a two-liter, three neck, round bottom flask equipped with a two-blade paddle stirrer, thermometer, condenser, heating mantle with temperature controller, and provision for sweeping in a blanket of a blend of oxygen and nitrogen. (Oxygen concentration in the gas stream is monitored by gas-liquid chromatographic (GLC) techniques, and in the monomer mix is checked by a Beckman oxygen analyzer).

The monomer phase containing initiator is charged to the reactor, and the head space is swept with an appropriate gas mixture (e.g., 2% oxygen in nitrogen) until equilibruim is reached at 25° C. Then the aqueous phase is charged and the stirrer is set at about 210 rpm to produce the droplets of monomer in aqueous dispersion, while the gas sweep is maintained. The following is representative polymerization reaction materials charge in grams.

| | |
|---|---|
| Styrene | 489.4 |
| Divinylbenzene (54.7% conc.) | 85.3 |
| Methyl acrylate | 8.8 |
| "Percadox-16" initiator | 2.04 |
| (di(4-t-butycyclohexyl) peroxydicarbonate) | |
| Water | 510.3 |
| "Padmac A" dispersant poly(diallyl dimethyl ammonium chloride) | 20.1 |
| "Pharmagel" protective colloid (gelatin) | 1.6 |
| Boric acid | 0.88 |
| Sodium nitrite | 0.59 |
| Sodium hydroxide solution (50% conc.) added to pH 10–10.5 | |

The oxygen-nitrogen gas sweep is passed at 140 cc/min. over the dispersion as it is heated from 25° C. to 57° C. in 45 minutes, then maintained at 57±2° C. for 7 hours. The batch is then heated to 75° C. over a 30 minute period and held at 75° C. for one hour. The copolymer beads are washed and excess water is removed by vacuum filtration on a Buchner funnel.

SULFONATION OF COPOLYMER

A portion of the wet polymer beads prepared above (110 gms.) is added to 600 grams of 95% $H_2SO_4$ in a one liter flask equipped with stirrer, condenser, dropping funnel, thermometer, caustic scrubber and heating means. Thirty grams of ethylene dichloride (bead swelling agent) are added, and the suspension is heated from 30° C. to 120° C. over a 3 hour period. This is followed by a hydration procedure in which water is added to quench the product. The polymer beads are transferred to a backwash tower and backwashed to remove residual acid. The resulting ion exchange resin product is characterized by the following properties:

| | |
|---|---|
| Whole beads | 99% |
| Cracked beads | 2% |
| Fragmented beads | 1% |
| Perfect beads | 97% |
| Friability: Chatillon value, g/bead | 2139 |
| Solids, H+ form | 44.7% |
| Solids, Na+ form | 51.5% |
| Salt Splitting Cation Capacity, meq./g dry | 5.21 |

Additional crosslinked sytrene copolymers are prepared as above with variations in the oxygen concentration in the reactor head space, then sulfonated as above to yield ion exchange resins, the properties of which are compared to commercial sulfonated resins made from copolymers prepared without oxygen addition during polymerization. In the following table, the resins of this invention are designated as A, B and C.

| Resin | Oxygen Level % | Chatillon, g/bead | Microcycling Stability* Before** | Microcycling Stability* After |
|---|---|---|---|---|
| A | 8 | 2150 | 97/3/0 | 96/4/0 |
| B | 8 | 2360 | 98.5/1.5/0 | 98.5/1.5/0 |
| C | 4 | 2300 | 100/0/0 | 98/2/0 |
| Commercial Resin A | — | 300 | 72/26/2 | 49/46/5 |
| Commercial Resin B | — | 510 | 98.5/1.5/0 | 55/42/3 |

Notes:
*100 Cycles with 1N HCl and 0.5N NaOH solutions.
**Perfect/Cracked/Fragmented.

Other crosslinked styrene copolymers are prepared in accordance with this invention using oxygen incorporation, then chloromethylated and aminated in a conventional manner to form strong base anion exchange resins, the properties of which are compared to commercial resins having the same functional groups and made from copolymers prepared without oxygen addition during polymerization. In the following table, the resins of this invention are desingted as D, E and F.

| Resin | Anion Exchange Capacity, meq/gm. | Initial appearance* | % Solids | Chatillon, gm/bead | Appearance* After Microcycling |
|---|---|---|---|---|---|
| D | 4.32 | 97/1/2 | 47.8 | 698 | — |
| E | 4.34 | 98/1/1 | 48.9 | 768 | — |
| F Commercial | 4.44 | 99/1/0 | 46.7 | 1022 | — |

-continued

| Resin | Anion Exchange Capacity, meq/gm. | Initial appearance* | % Solids | Chatillon, gm/bead | Appearance* After Microcycling |
|---|---|---|---|---|---|
| Resin C Commerical | 4.20 | 93/7/0 | 46.0 | 140 | 5/90/5 |
| Resin D | 4.40 | 94/5/1 | 42.5 | 400 | 79/21/0 |

*Appearance - Bead Count : Perfect/Cracked/Fragmented

ADDITIONAL SPECIFIC EXAMPLES

In a manner similar to the process described above in the "Polymerization Procedure" additional copolymers were prepared and functionalized to produced strong acid cation and strong base anion resins. Using the same reactor set-up as described above a monomer phase (represented by "A" below) containing an initiator was charged to the reactor and either the monomer was previously saturated with oxygen or the reactor bead space swept with an oxygen-containing gas, e.g., 8% $O_2$ in nitrogen, until equilibrium was reached at 25° C. (typically 30 minutes). The aqueous phase ("B" below) was then charged (monomer : aqueous ratio =1.1 : 1.0) and the stirrer was set at about 210 rpm to produce droplets of monomer in aqueous dispersion. The oxygen-nitrogen gas sweep, if any, was passed over the dispersion at 140 cc/min for the remainder of the reaction (alternatively a pressure of about 5-15 psig was used).

The following were representative reaction material charges in parts per hundred of each solution.

SOLUTION A (MONOMER PHASE)

| (a) | Styrene | 83.6 |
|---|---|---|
| (b) | Divinylbenzene (54.7% conc.) | 14.6 (8.0 active) |
| (c) | Methylacrylate | 1.5 |
| (d) | Di(4-t-butylcyclohexyl)-peroxydicarbonate:Percadox-16 (initiator) | 0.35 |
| (e) | t-Butyl peroctoate (chaser) | — |

SOLUTION B (AQUEOUS PHASE)

| (a) | Water | 95.3 |
|---|---|---|
| (b) | Poly(tetraalkyl ammonium chloride) (dispersant) | 3.75 |
| (c) | Gelatin (protective colloid) | 0.30 |
| (d) | Boris acid | 0.16 |
| (e) | Sodium nitrite | 0.11 |
| (f) | Sodium hydroxide solution (50% conc.) added to pH 10.5-11.0 | 0.2-0.4 |

The reaction mixture was heated from 25° C. to 57° C. in 45 minutes and maintained at 57±2° C. for 7 hours. The batch was then heated to 75° C. over a 30 minute period and held at 75° C. for one hour. (chase step); if a coinitiator was used as a chaser, e.g., t-butyl peroctoate (tBP), the batch was then heated to 95° C. over a 30 minute period and held at 95° C. for one hour (final chase step). The batch was then cooled and the copolymer beads were washed and excess water was removed by vacuum filtration on a Buchner funnel. The specific reaction conditions and final product properties of styrene/DVB resins are summarized in the following table, where crosslinker content is expressed as the percent "active" crosslinker ingredient, and other monomer components of the commercial grade crosslinker (principally ethyl vinyl benzene) are calculated as part of the monovinyl monomer. Crosslinker content given elsewhere herein and in the claims is also calculated on an "active" basis. Further, all ion exchange resin test values given herein and in the claims, relate to fully functionalized copolymers, that is to resins of high capacity and reasonable commerical quality.

| Example | Initiator Percadox-16 (%) | Reaction Hold Temp (°C.) | Reaction Time Hours | Oxygen Addition Monomer Sparge | Reaction Sweep | Cross-linker DVB (%) | Other Monomers AN* % | FINAL PRODUCT PROPERTIES (H+FORM) Appearance Perf/Cr/Fr | Chatillon (g/bead) | Microcycling Test (after 100 cycles) |
|---|---|---|---|---|---|---|---|---|---|---|
| Cation Resins: | | | | | | | | | | |
| G | 0.45 | 63 | 5 | Air | 8% $O_2$ | 8.0 | 0 | 100/0/0 | 2038 | 99.5/0.5/0 |
| H | 0.35 | 63 | 6 | 8% $O_2$ | 8% $O_2$ | 8.0 | 0 | 100/0/0 | 1480 | 99/1/0 |
| I | 0.45 | 63 | 5 | 8% $O_2$ | $N_2$ | 8.0 | 0 | 98/2/0 | 1368 | 98/2/0 |
| J | 0.35 | 62 | 6.5 | Air | 8% $O_2$ | 8.5 | 0 | 98/2/0 | 1757 | 96.5/3.5/0 |
| K | 0.40 | 62 | 6 | Air | 8% $O_2$ | 8.5 | 0 | 99/1/0 | 2019 | 98.5/1.5/0 |
| L | 0.45 | 63 | 4 | Air | 8% $O_2$ | 10.0 | 0 | 100/0/0 | 2100 | 98.5/1/0.5 |
| M | 0.35 | 63 | 5.5 | 8% $O_2$ | 8% $O_2$ | 10.0 | 0 | 99/1/0 | 2646 | 99/1/0 |
| M' | 0.35 | 63 | 6.0 | 8% $O_2$ | 8% $O_2$ 15 psig | 8.0 | — | 100/0/0 | 3100 | |
| Anion Resins: | | | | | | | | | Cl⁻ Form | |
| N | 0.45 | 55 | 11 | 8% $O_2$ | 4% $O_2$ 15 psig | 4.25 | 0.0 | 99/1/0 | 973 | — |
| O | 0.45 | 58 | 8.5 | 8% $O_2$ | $N_2$ | 3.8 | 2.0 | 99/1/0 | 740 | 94/6/0 |
| P | 0.45 | 58 | 8.5 | 8% $O_2$ | 8% $O_2$ 15 psig | 3.8 | 2.0 | 100/0/0 | 771 | 94/6/0 |
| Q | 0.45 | 58 | 8.5 | 8% $O_2$ | 8% $O_2$ | 3.5 | 2.0 | 99/1/0 | 780 | — |
| R | 0.45 | 58 | 8.5 | 8% $O_2$ | $N_2$ | 3.5 | 2.0 | 95/4/1 | 611 | 83/16/1 |
| S | 0.45 | 58 | 9.0 | 8% $O_2$ | 8% $O_2$ | 3.8 | 2.0 | 98/2/0 | 1168 | — |

-continued

| | | | Re- | | | | | FINAL PRODUCT PROPERTIES (H⁺FORM) | | |
|---|---|---|---|---|---|---|---|---|---|---|
| | Initiator | Reaction | action | Oxygen Addition | | Cross- | Other | | | Microcycling |
| Ex-ample | Percadox-16 (%) | Hold Temp (°C.) | Time Hours | Monomer Sparge | Reaction Sweep | linker DVB (%) | Monomers AN* % | Appearance Perf/Cr/Fr | Chatillon (g/bead) | Test (after 100 cycles) |
| | | | | | 15 psig | | | | | |

*AN = acrylonitrile

I claim:

1. Ion exchange resin bead having high perfect bead count, improved mechanical strength and resistance to swelling pressures comprising functionalized crosslinked gel copolymer beads of a minor amount of a polyvinyl aromatic hydrocarbon monomer, up to 5 mole percent of a non-aromatic monomer and the remainder a monovinyl aromatic hydrocarbon monomer, said beads having a birefringence pattern corresponding substantially to at least one of FIG. IA, B, C or D when the beads are cationic and swollen in water and corresponding substantially to at least one of FIGS. IIIA, B or C when the beads are anionic and swollen to equilibrium in ethanol, said beads further having a Chatillon value of greater than 900 g/bead in the case of a cationic resin and greater than 600 g/bead in the case of an anionic resin.

2. The improved ion exchange resin beads of claim 1 wherein the copolymer is a styrene/divinyl benzene gel-type containing about 4–12% by weight divinyl benzene and the functionalized resin derived therefrom is cationic and exhibits a strain birefringence pattern which substantially consists of at least one pattern selected from:
   (a) a broad-armed Maltese cross enclosed by an extinction ring around the perphery of the bead,
   (b) a broad-armed Maltese cross enclosed by an extinction ring that is distinctly inside and separated from the periphery of the bead, and
   (c) an irregular pattern defining a randomly oriented chain or recognizable as a distorted version of (b).

3. The improved cation exchange resin of claim 2 wherein the resin exhibits a strain birefringence pattern which substantially consists of a broad-armed Maltese cross enclosed by an extinction ring around the periphery of the bead.

4. The improved cation exchange resin of claim 2 wherein the resin exhibits a strain birefringence pattern which substantially consists of a broad-armed Maltese cross enclosed by an extinction ring that is distinctly inside and separated from the periphery of the bead.

5. The improved cation exchange resin of claim 2 wherein the resin exhibits a strain birefringence pattern which substantially consists of an irregular pattern defining a randomly oriented chain or recognizable as a distorted broad-armed Maltese cross enclosed by an extinction ring that is distinctly inside and separated from the periphery of the bead.

6. The improved cation exchange resin of claim 2 wherein the divinyl benzene component of the copolymer is 7–10% by weight of the copolymer.

7. The improved cation exchange resin of claim 6 wherein the resin has (1) at least 90% perfect beads, by count (2) a Chatillon value of at least 1200 gm/bead and (3) a loss of perfect bead count of not more than 10% upon 100 cycles by the Microcycling Test.

8. The improved cation exchange resin of claim 2 wherein the resin has (1) at least 90% perfect beads, by count (2) a Chatillon value of at least 1200 gm/bead and (3) a loss of perfect bead count of not more than 10% upon 100 cycles by the Microcycling Test.

9. The improved cation exchange resin of claim 6 wherein the resin exhibits a loss of perfect bead count of not more than about 5% after 100 cycles by the Microcycling Test.

10. The improved ion exchange resin beads of claim 1 wherein the resin is an anion resin.

11. The improved anion exchange resin beads of claim 10 wherein the copolymer is a styrene/divinyl benzene-type containing about 1–10% by weight of divinyl benzene and the functionalized resin derived therefrom exhibits a strain birefringence pattern which substantially is a broad Maltese cross of relatively high intensity when the beads are swollen to equilibrium in ethanol.

12. The improved anion exchange resin beads of claim 10 wherein the resin is a styrene/divinyl benzene-type containing about 2–5% by weight of divinyl benzene.

13. The improved anion exchange resin of claim 10 wherein the resin additionally has (1) at least 90% perfect beads, by count, (2) a Chatillon value of at least 600 gm/bead and (3) a loss of perfect bead count of not more than 30% upon 100 cycles by the Microcycling Test.

14. The improved anion exchange resin of claim 13 wherein the resin contains at least 93% perfect beads.

15. The improved anion exchange resin of claim 11 wherein the resin has a Chatillon value greater than 1100 gm/bead.

16. The improved anion exchange resin of claim 11 wherein the loss of perfect bead count is not more than 10% upon 100 cycles by the Microcycling Test.

17. The improved anion exchange resin of claim 13 wherein the loss of perfect bead count is not more than 5% upon 100 cycles by the Microcycling Test.

18. In the process of preparing hard, crosslinked, discrete copolymer beads by the free-radical polymerization in an aqueous dispersion of a monomer mixture comprised of about 80–99% by weight of the mixture of monovinyl aromatic monomer and about 1–20% by weight of the mixture of a crosslinking monomer having at least two active vinyl groups, the improvement which comprises conducting the polymerization reaction at a temperature within the range of about 30°–95° C. with oxygen in contact with or dissolved in the monomer mixture, or a combination of both.

19. The process of claim 18 wherein the reaction temperature is from 50° to 70° C.

20. The process of claim 18 wherein the monovinyl monomer is a monovinyl aromatic monomer.

21. The process of claim 20 wherein the monovinyl aromatic monomer is styrene and the crosslinking monomer is divinyl benzene.

22. A process for producing an ion exchange resin having improved physical strength which comprises functionalizing the copolymer product produced according to the process of claim 18.

23. The process of claim 18 wherein the monomer mixture is saturated with air before polymerization.

24. The process of claim 23 wherein the monomer mixture is in contact with an oxygen-containing gas mixture comprising about 8% by volume of oxygen during polymerization.

25. The copolymer produced according to claim 18.

26. The copolymer produced according to claim 24.

27. Improved cation exchange resin beads produced in accordance with the process of claim 27 with sulfonic acid functionality having higher mechanical strength and resistance to swelling pressures comprising crosslinked resin beads with (1) at least 95% perfect beads, by count, (2) a Chatillon value of at least 900 gm/bead and (3) a loss of perfect bead count of not more than 5% upon 100 cycles by the Microcycling Test.

28. The improved cation exchange resin beads of claim 27 wherein the crosslinked resin beads have (1) at least 95% perfect beads, by count, (2) a Chatillon value of at least 1200 gm/bead and (3) the loss of perfect bead count is not more than 5% upon 100 cycles by the Microcycling Test.

29. The improved cation exchange resin beads of claim 27 wherein the (1) perfect bead count is at least 98% (2) the Chatillon value is at least 1200 gm/bead and (3) the loss of perfect bead count is not more than 2% upon 100 cycles by the Microcycling Test.

30. Improved anion exchange resin beads produced in accordance with the process of claim 27 with quaternary ammonium functionality having higher mechanical strength and resistance to swelling pressures comprising resin beads with (1) at least 90% perfect beads, by count, (2) a Chatillon value of at least 700 gm/bead and (3) a loss of perfect bead count of not more than 30% upon 100 cycles by the Microcycling Test.

31. The improved anion exchange resin beads of claim 30 wherein the resin contains at least 98% perfect beads.

32. The improved anion exchange resin beads of claim 30 wherein the resin has a Chatillon value of greater than 200 gm/bead.

33. The improved anion exchange resin beads of claim 30 wherein the loss of perfect bead count is not more than 3% upon 100 cycles of the Microcycling Test.

* * * * *

UNITED STATES PATENT AND TRADEMARK OFFICE
CERTIFICATE OF CORRECTION

PATENT NO. : 4,192,921
DATED : March 11, 1980
INVENTOR(S) : Mark Jerome Dales

It is certified that error appears in the above-identified patent and that said Letters Patent are hereby corrected as shown below:

Column 1, line 5, should read -- This Application is a Continuation-in-Part of my earlier filed copending Application Serial No. 766,120 filed February 7, 1977, now abandoned --.

Column 2, line 54, "Figs. I and II" should read -- Figs. I and III --.

Column 2, line 57, "Figs. II and III" should read -- Figs. II and IV --.

Signed and Sealed this

Eleventh Day of November 1980

[SEAL]

Attest:

Attesting Officer

SIDNEY A. DIAMOND

Commissioner of Patents and Trademarks